March 6, 1928.

J. TAYLOR

BATTERY TESTER

Filed Jan. 22, 1927

1,661,913

Inventor
John Taylor.

By William C. Linton.
Attorney

Patented Mar. 6, 1928.

1,661,913

UNITED STATES PATENT OFFICE.

JOHN TAYLOR, OF CHICAGO, ILLINOIS.

BATTERY TESTER.

Application filed January 22, 1927. Serial No. 162,875.

This invention relates to improvements in battery testing devices whereby the efficiency of the cells thereof may be accurately and conveniently tested, the invention having for an object to provide a portable device of this particular character so constructed and designed that it may be advantageously used in confined or limited spaces, effecting positive electrical contact with the battery cell terminals upon the application of but minimum force or pressure thereto and affording the user with a clearly visible reading.

It is also an object of the invention to provide a testing device of unusually rugged construction, thereby avoiding the damaging or injuring of the working parts of the same by reason of the rough and severe usage to which such devices are ordinarily subjected.

Amongst other important desideratums of the invention there may be mentioned the provision of a testing device wherein the contact prods are not connected in a direct mechanical manner to the volt meter, but rather, are connected to a portion of the device apart from such prods, thus causing the major portion of shocks or stresses to which said prods are ordinarily subjected, to be effectually diffused and, to a great extent, absorbed, prior to their transmission to the volt meter, hence preventing injury to its comparatively delicate construction.

Other objects of the invention will be in part obvious and in part pointed out hereinafter.

In order that the invention and its mode of operation may be readily understood by those skilled in the art, I have in the accompanying illustrative drawings and in the detailed following description based thereupon, set out one possible embodiment of the invention.

Figure 1:
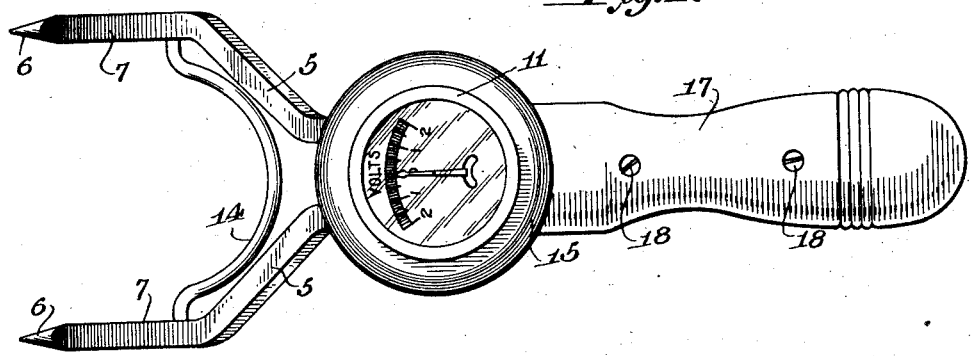
Figure 2:
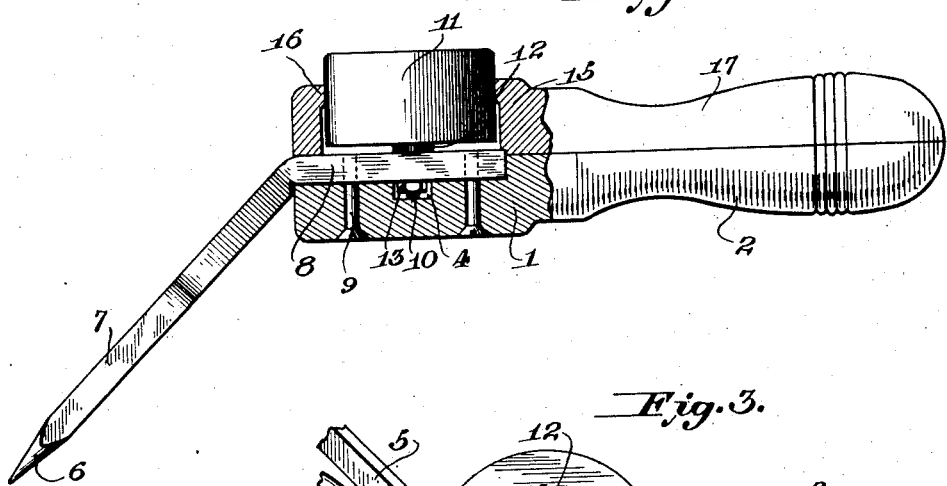
Figure 3:
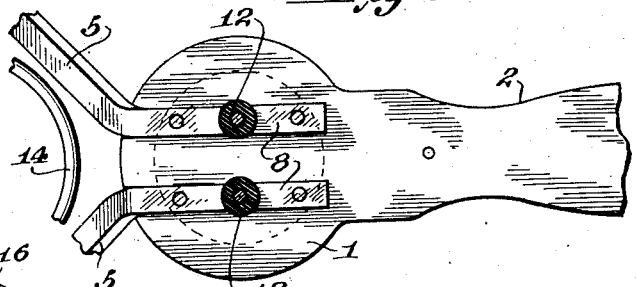
Figure 4:
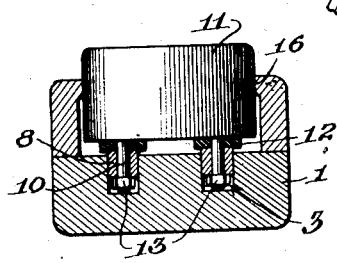

In these drawings:

Figure 1 is a top view of the improved testing device,

Figure 2 is a side elevation of the same having a portion thereof broken away as shown in vertically longitudinal section, Figure 3 is a fragmentary detail, partially in section, showing one section of the handle of the testing device removed to illustrate the manner in which the prods are connected to said handle section and indirectly and electrically connected to the volt meter and Figure 4 is a vertical transverse section through the device.

Having more particular reference to the drawings, in connection with which like characters of reference will designate corresponding parts throughout, the improved device may be stated to comprise a body portion formed of wood or other suitable insulating material, such as conditions or preference may dictate, the same being designated for convenience by the numeral 1 and having a laterally disposed handle section 2 extended therefrom, as is shown in the Figure 2. This body portion 1 is substantially circular in configuration and is formed upon its normally upper face with a pair of relatively spaced and substantially diametrically disposed grooves or ways 3, certain of the ends of which open onto the adjacent marginal portions of said body as is shown in the Figures 2 and 3, also, recesses or pockets 4 are formed within the bottoms of the intermediate portions of the grooves or ways 3, for a purpose which will be presently described.

Contact prods are provided the device and as will be noted upon reference to the Figure 2, these prods are formed of suitable electrically conducted material such as metal or the like, and have their normally upper or inner portions so formed as to be snugly received in the ways 3, aforesaid, while those portions of the prods extending beyond the body portion 1 are bent upon themselves to assume an oblique downwardly direction with respect to said body portion; the free extremities of the prods being sharpened or pointed as at 6. In addition to the oblique downward disposition of those portions of the prods 6 extended from the body portion 1, it will be also seen, upon reference to the Figure 1, that said oblique portions are bent intermediately of their respective extremities so that the free ends thereof are arranged in substantially in parallelism as is indicated by the numeral 7, thus causing a substantially divergent arrangement with respect to those portions engaged in the ways 3.

To secure the prods in fixed relation with respect to the body portion 1, those portions thereof engaged in the ways 3 and indicated at this time for convenience by the numeral 8 are provided with transversely disposed openings adapted to receive locking screws 9 therein, said screws being passed through complementally arranged openings formed in the body portion 1, as is shown in the Figure 2. Consequently upon this connection, it will be appreciated that the prods 7 will be rigidly joined to the body portion 1 through the medium of the direct mechanical connection in form of the locking or connecting screws 9.

Other openings are formed in the portions 8 of the prods 7 and receive therethrough the tying or connecting bolts 10 of a volt meter 11 positioned directly above the said portions 8 and resting upon combined insulating and cushioning pads 12 engaged over the shank portions of said bolts 10, while locking nuts 13 are engaged with the extremities of the bolts below the normally lower or under sides of the portions 8 of the prods and thus, serve to electrically connect said volt meter to the same, that is, to constitute in effect, a shunt circuit from the prods 7 in which the volt meter 11 is included. Also, a resistor 14 is electrically connected between the prods 7.

That the volt meter 11 positioned upon the portions 8 of the prods 7 and electrically connected thereto may be provided with an effectual protective means in order to avoid damaging or injuring to its comparatively delicate construction, a ring like protective element 15 is snugly engaged over the peripheral portion thereof and has direct bearing upon the adjacent and normally upper surface of the body portion 1, it being noted in this connection, that the size and general configuration of said element corresponds to that of the circular body portion 1. The upper or outer portion of the protective ring like element 15 is formed with an inwardly disposed contact flange 16, which, as shown in the Figure 2, has actual contact with the adjacent peripheral portion of the volt meter 11, thus reducing to the greatest possible extent, the area of contact of the protective element 15 with the casing of the volt meter 11 and hence minimizing the transmission of shocks or stresses to said casing from the protective element 15.

A handle section 17 is formed upon and extends from one portion of the protective element 15, being complemental in its design or configuration to the handle section 2, aforesaid, whereupon these several handle sections 2 and 17 are fixedly connected to each other through the medium of connecting or tie bolts 18 passed therethrough and suitably secured against displacement through the medium of ordinary locking nuts engaged with their threaded extremities.

In usage of my improved testing device, the handle thereof formed by the sections 2 and 17 is gripped by the user and the pointed or sharpened end 6 of the prods 7 are engaged with the terminals of the battery cells to be tested. The discharging current passing through the resistor 14 will act upon the volt meter 11 to indicate to such user the voltage or the efficiency of that particular cell. The operation may be repeated by removing the pointed ends of the prods 7 from the first tested cell and engaging the same with the terminals of other cells by simple and convenient transfer of the device. Because of the fact that the handle of the device will be normally in a horizontal or substantially horizontal position and away from, to some extent, the battery whose cells are being tested, the face side of the volt meter 11 will at all times be visible and consequently upon this condition, a convenient and accurate reading may be readily had by the user of the device. Furthermore, it will be understood that because of the disposition of the prods 7 with respect to the handle of the testing device, such device may be effectually and advantageously used in confined or limited spaces because of the fact that to establish electrical contact as between said prods 7 and the terminals of a storage battery, it is necessary only to move the device in a lateral manner until the pointed ends of such prods are engaged with the desired cell terminals. Likewise, the device may be as easily and as quickly disengaged from a battery without inconvenience to the user. Attention is also invited to the fact that because of the peculiar formation and disposition of the prods 7 with respect to the body and handle portions of the testing device, the pointed ends 6 of said prods will be caused to have a "digging-like" engagement with the cell terminals desired to be engaged thereby upon horizontal or substantially horizontal movement of said handle, that is, these pointed portions 6 of the prods 7 will be caused to move at substantially right angles to the line of movement of the handle of the device, hence effecting what I term as a "digging-like" engagement thereof with the battery terminal and consequently, effecting a positive electrical engagement of the prods 7 with the battery cell terminal and hence, bringing about an effectual and accurate testing reading.

Because of the arrangement of the volt meter 11 within the protective ring like element 15 secured to the normally upper side of the body portion 1 through the medium of the bolts 18 passing through the handle sections 2 and 17, it will be also understood that damage or injury to said volt meter will be materially avoided and by consequence, inaccuracy upon part of the delicately adjusted mechanism thereof will be prevented. Also, because of the fact that the portions 8 of the prods 7 are directly and mechanically connected to the body portion 1 and that the volt meter 11 is somewhat indirectly connected to said prods through the medium of the interpositioning of the cushioning and insulating pads 12 therebetween, the major portion of shocks or stresses imparted to said prods 7 during their ordinary usage will be diffused and, for the greater part, absorbed in the body portion 1 and its handle extension 2 prior to transmission thereof to the protective ring like element 15 so that when the shocks or stresses ultimately reach the working parts of the volt meter 11 they will be negligible and consequently thereupon, will not serve to damage the delicately adjusted working parts of the same.

Manifestly, the construction shown is capable of considerable modification and such modification as is within the spirit of my claims, I consider within the scope of my invention.

I claim:

1. A battery tester comprising a body portion having a pair of ways formed in one side thereof, prods having portions of the same engaged in said ways and directly connected to said body portion, portions of said prods extending beyond the body portion, a handle for the body portion, a resistor connected to the prods, a volt meter electrically connected to portion of said prods, cushioning means interposed between such volt meter and said prods, and a protective means arranged about the volt meter and connected to said body portion.

2. A battery tester comprising a body portion, prods directly connected to said body portion and extending beyond the same, the extended portions of said prods being disposed at oblique angles with respect to the body portion, a resistor connected to the prods, a volt meter electrically connected to said prods, cushioning means between the volt meter and said prods, and a protective means arranged about the volt meter and connected to the body portion.

3. A battery tester comprising a body portion, a handle therefor, prods fixedly and directly connected to said body portion having portions of the same extended at oblique angles from the body portion, the free ends of the extended portions of the prods being disposed in a plane different from that of the body portion, a resistor connected to the prods, a volt meter electrically connected to the prods, and cushioning means interposed between said volt meter and said prods.

4. A battery tester comprising a body portion, a laterally disposed handle therefor, prods fixedly and directly connected to said body portion and extending at oblique angles therefrom, a resistor connected to the prods, a volt meter electrically connected to the prods, cushioning means interposed between said volt meter and the prods, a ring like protective element snugly engaging such volt meter and connected to the body portion, and a resistor connected to the prods.

5. A battery tester comprising a body portion having a lateral handle extended therefrom, prods directly and fixedly connected to the body portion, portions of said prods being disposed at oblique angles with respect to the body portion and extended therefrom, a resistor connected to the prods, a volt meter electrically connected to the prods, a resistor connected to the prods, cushioning and insulating pads interposed between the prods and the volt meter, and a protective means snugly and embracingly engaging said volt meter and connected to the body portion.

In witness whereof I have hereunto set my hand.

JOHN TAYLOR.